United States Patent [19]
Scapes

[11] 3,771,765
[45] Nov. 13, 1973

[54] SELF-LAPPING SEAL STRUCTURE
[75] Inventor: John N. Scapes, Schaumburg, Ill.
[73] Assignee: Imperial-Eastman Corporation, Chicago, Ill.
[22] Filed: Aug. 31, 1971
[21] Appl. No.: 176,653

[52] U.S. Cl............. 251/310, 137/625.47, 251/368
[51] Int. Cl............................................. F16k 5/02
[58] Field of Search.................... 251/310, 311, 312, 251/309, 368; 137/625.47

[56] References Cited
UNITED STATES PATENTS

| | | | |
|---|---|---|---|
| 3,038,694 | 6/1962 | Dunbeck et al. | 251/309 X |
| 3,066,909 | 12/1962 | Reed, Jr. | 251/309 |
| 2,965,123 | 12/1960 | Hulsander | 251/368 X |
| 3,206,530 | 9/1965 | Boteler | 251/368 X |
| 3,395,890 | 8/1968 | Eckert et al. | 251/368 X |
| 2,864,579 | 12/1958 | Stoltenberg | 251/309 |
| 3,157,195 | 11/1964 | McIntosh et al. | 251/317 X |
| 3,171,431 | 3/1965 | Hansen et al. | 137/454.6 |
| 3,508,573 | 4/1970 | Smith | 251/309 X |
| 3,542,336 | 11/1970 | Giese | 251/309 X |
| 3,675,895 | 7/1972 | Matousek | 251/315 |

Primary Examiner—Samuel Scott
Attorney—Axel A. Hofgren et al.

[57] ABSTRACT

A fluid seal structure for use in devices such as fluid flow control valves wherein the relatively movable seal elements incorporate integral self-lapping means for effecting an accurate seal fit in the final seal construction. The self-lapping means may comprise an abrasive surface portion of one of the elements having preselected cold flow characteristics providing for lapping-in of the confronting element relative to the abrasive element surface portion and cold flow of the lapping element into microscopic depressions which may remain in the confronting element notwithstanding the lapping-in operation. The fluid seal construction is adapted for use in valves wherein the elements are originally machined to have accurate fitted conformation with the lapping-in and cold flow operations providing for further improved sealed association between the elements.

19 Claims, 4 Drawing Figures

PATENTED NOV 13 1973　　　　　　　　　　　　　　3,771,765

Inventor:
John N. Scapes
By Hofgren, Wegner,
Allen, Stellman & McCord
Attys

SELF-LAPPING SEAL STRUCTURE

BACKGROUND OF THE INVENTION

1. Field of the Invention

This invention relates to fluid seal constructions and in particular to such constructions adapted for use as seal members of valve devices.

2. Description of the Prior Art

In known fluid seal constructions, such as provided in valves and the like, movable valve elements are caused to conform to the confronting valve element by forcibly urging the elements together in the closed condition of the valve, permitting the relative deformation of the elements to effect the desired fluid-tight seal. One method employed to effect a relatively accurate conformity of the valve elements to each other to provide a grinding means so as to grind the elements into final conforming configurations. The grinding means, which may comprise a loose abrasive, is then flushed from the valve upon completion of the forming step.

Another approach to providing accurate conformity of the relatively movable valve elements is to provide one of the valve elements which is softer than the other so as to permit wear of the softer element into the desired conformity.

A number of valves have been developed wherein at least one of the relatively movable elements comprises a synthetic plastic element which may be softer than the confronting element to provide the desired wear. In one form of such plastic element, reinforcement fibers may be provided to increase the strength of the element. Plastic material having a low coefficient of friction is also utilized in valve elements for facilitating operation of the valve. Examples of U.S. letters Pat. which disclose such valve structures are those of Evans et al. No. 1,057,717; Morrison No. 1,099,389; Trautman No. 2,358,950; Steinbuch et al. No. 2,950,081; and Windsor No. 3,160,387.

In one form of commerically available ball valve, the sealing means is formed of a synthetic plastic provided with glass wool reinforcing means for improved strength.

SUMMARY OF THE INVENTION

The present invention comprehends an improved fluid seal construction wherein a self-lapping of the confronting seal surface portions is effected so as to provide an accurate fluid sealed engagement therebetween in the final arrangement of the seal construction. The self-lapping is effected by providing abrasive material in at least one of the surface portions adapted to lap in with the confronting surface portion as the result of lateral movement therebetween under a preselected lapping pressure. The lapping material may further comprise cold flowable material suitable to have cold flow of portions thereof into the microscopic depressions of the confronting lapped surface portion so as to further effect intimate sealed association of the elements. The surface portion is made to have a preselected thickness correlated with the physical character of the lapping material whereby the desirable cold flow action is obtained.

Illustratively, the lapping cold flowable element may be formed of a synthetic plastic, such as Teflon, which further provides low friction characteristics desirable where the seal construction is utilized as a valve construction. The abrasive material may be particulate and dispersed in the synthetic plastic matrix material. In the illustrated embodiment, the abrasive material comprises glass fibers having preselected abrasive characteristics suitable for lapping the confronting seal surfaces, in contradistinction to the conventional grinding operation effected by use of grinding materials in known valve forming methods.

The seal construction of the present invention is extremely simple and economical of construction, while yet providing the highly desirable advantages discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
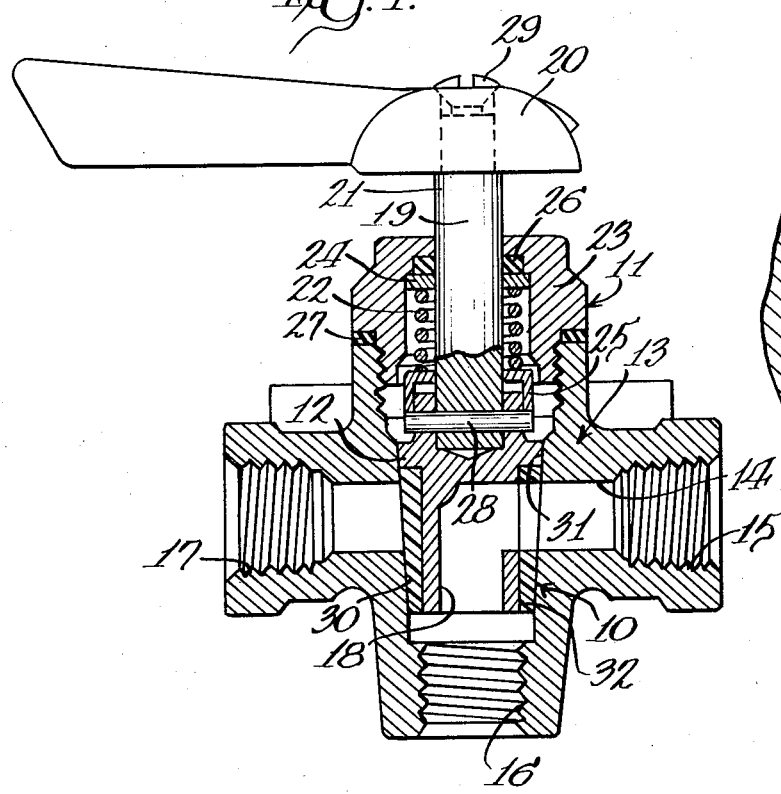
FIG. 1 is a diametric section of a plug valve having a fluid seal construction embodying the invention.

In the exemplary embodiment of the invention as disclosed in the drawing, a fluid seal construction generally designated 10 is illustrated in FIG. 1 for use in a valve 11 comprising a plug valve having a frustoconical plug 12 rotatably carried in a body 13 for selectively controlling fluid flow through a passage 14 in the valve body between respective ports 15, 16 and 17 as determined by the disposition of a plug passage 18 selectively communicating with the ports 16 and 17 as a result of the rotation of the plug 12 about its longitudinal axis 19 such as by means of a handle 20 carried on the upper end of a stem 21 on which the plug is mounted. Plug 12 is biased axially downwardly by a suitable coil spring 22 received in a cap portion 23 of the valve body. The upper end of the spring 22 bears against a suitable washer 24 and the lower end bears against a suitable cap 25 for providing the downward urging force as the result of the compression of spring 22 therebetween. A sealing gasket 26 may be provided above the washer 24 for sealing the valve stem 21 to the cap 23 and the cap 23 may be sealed to the body 13 by a suitable annular washer 27 disposed coaxially therebetween. Plug 12 may be secured to the lower end of the valve stem 19 by a suitable radial pin 28 for rotation of the plug with the stem by manipulation of the handle 20 which may be secured to the upper end of the stem such as by suitable means, such as screw 29.

Fluid seal construction 10 includes means on one of said plug 12 or valve body 13 providing improved sealing therebetween and in the illustrative embodiment, includes a plug sleeve 30 carried on the lower end of plug 12 and a complementary seating surface 31 provided on valve body 13. Valve 11 illustratively comprises a substantially conventional plug valve construction wherein the seat 31 is frustoconical narrowing downwardly. Illustratively, the included taper angle may be approximately 8° with the length of the frustoconical seat 31 being approximately 1 inch.

Plug sleeve 30 is retained on plug 12 against rotation thereon by suitable means such as serrated, or knurled, outer portion 32 of the plug 12. Alternatively, sleeve 30 may be molded in place on the plug 12. Where the sleeve is formed separately, the sleeve may be provided with an original internal diameter of approximately 0.005 inch less than the outer diameter of the knurled plug surface 32 so as to provide a force fit locking the sleeve to the plug 12 against rotation while yet permitting replacement of the sleeve on the plug when desired. In the illustrated embodiment, the plug sleeve has a length of approximately ¾ inch.

Plug sleeve 30 herein is formed of a cold flowable, lapping material adapted to effect a self-lapping function in the valve construction and a cold flow conformity thereof with the body seat surface 31 providing an improved fluid sealed association of the plug sleeve with the valve body in the closed condition of the valve. To this end, sleeve 30 is formed of a material having a preselected cold flow characteristic whereby the outer surface of the plug is caused to cold flow into the microscopic depressions of the valve seat 31 as a result of the pressure applied to the movable valve member by the coil spring 22. Further, the plug sleeve comprises a lapping material as indicated above, illustratively being formed of a synthetic plastic having abrasive material distributed therein. In the illustrated embodiment, the plug sleeve is formed of a fluorinated hydrocarbon, and more specifically, in the illustrated embodiment is formed of Teflon (polytetrafluorethylene), with the abrasive material comprising fibrous material, such as fiberglass, and particulate material, such as molybdenum powder. An excellent formulation for the plug sleeve material has been found to be one wherein approximately 15 percent of the plug sleeve material comprises the fiberglass material and five percent comprises the molybdenum material.

Figure 3:
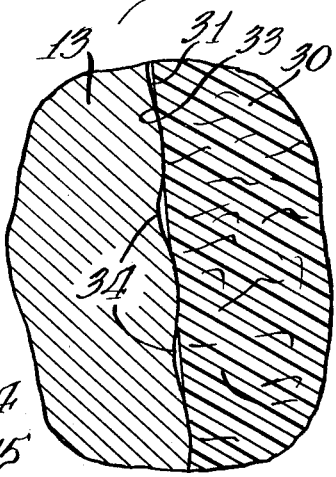
FIG. 3 is a fragmentary enlarged section illustrating the arrangement of the confronting fluid seal construction elements prior to the lapping and cold flow steps.
Figure 4:
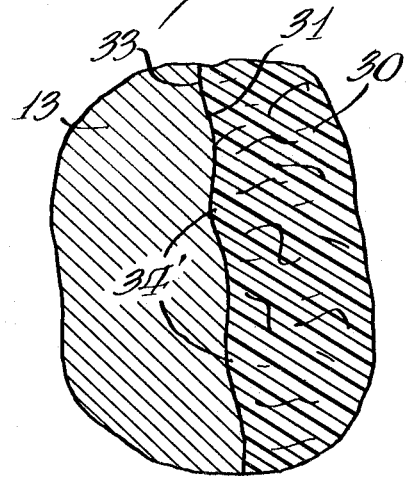
FIG. 4 is a fragmentary enlarged section illustrating the arrangement of the confronting fluid seal construction elements upon completion of the lapping and cold flow steps.

The fluid seal construction and the novel method of forming the same is best understood by reference to FIGS. 3 and 4 comprising substantially enlarged cross-sections of the confronting surface portions thereof. As shown in FIG. 3, the seat surface 31 and the plug surface 33 are originally machined to have highly accurate conformity of one with the other. However, notwithstanding such accurate manufacture, it has been found that irregularities in the surfaces which may be seen microscopically are normally present so that a completely accurate conformation of one seal construction surface with the other is not obtained notwithstanding the use of extremely high accurate valve element forming operation. The present invention comprehends providing a resultant final seal construction wherein the conformation of one seal element with the other is made to be very high notwithstanding the presence of such original irregularities.

Referring more specifically to FIG. 3, the seat surface 31 may have an irregular surface defined by depressions 34 when viewed microscopically. Outer surfaces 33 of the plug sleeve, therefore, will not have full facial engagement with the surface 31 notwithstanding high accuracy in the manufacturing process of the seat and plug sleeve elements. The seal structure, however, is caused to have substantially full face-to-face engagement in the final arrangement of the confronting surfaces, as shown in FIG. 4, by a combination of two effects. Firstly, a lapping-in of the surfaces is effected by a relative lateral movement between the two surfaces under a preselected pressure tending to smooth out the irregular valve seat surface 31. The lapping concept distinguishes from the grinding concept in that the lapping process is intended to smooth a surface which is substantially dimensionally determined, wherein in the grinding process, a preselected quantity of surface material is removed to achieve a final desired dimension. The present invention comprehends lapping the surface 31 so as to substantially unaffect the nominal outside dimension of the surface 31 while yet smoothing out microscopic high spots. To this end, the abrasive particles, herein comprising glass wool fibers embedded in the plastic matrix, define a lapping material which concurrently comprises one element of the final seal construction. As shown in FIG. 4, the cold flow characteristics of the matrix material of the plug sleeve 30 causes the surface 33 thereof to conform accurately to the lapped seating surface 31 by cold flow of the surface portion of the plug sleeve into the remaining depressions 34' of the lapped surfaces. The cold flow of the surface portion 33 is effected by the pressure forces generated by the spring 22 and tends to improve the seal between the surfaces 31 and 33 as a direct function of time upon closing of the valve.

It has been found that the thickness of the lappable element affects the compliance thereof with the confronting surface against which it seats in the closed condition of the valve. If the lapping element is overly thick, mass, or gross, cold flow may occur whereby the material may extrude into the flow passages or beyond the ends of the plug or seat. If the material is overly thin, it may have insufficient flowability to provide the desired compliance with the confronting surface. Investigation has determined that where the lapping element comprises sleeve 30 and is formed of 15 percent glass filled Teflon, a thickness of the sleeve in the range of approximately one-fourth to one-sixth the average outside diameter of the sleeve provides the desirable cold flow functioning. In the preferred embodiment, the sleeve has a thickness of approximately one-eighth the outside diameter thereof. As will be obvious to those skilled in the art, the use of different lapping materials will cause a variation in the range of desirable thickness.

The surface 31 may be lapped-in as a final step in the manufacturing of the valve 11 by suitable rotative manipulation of the plug sleeve 30 in the seat 31. Further, as the lapping material forms an integral part of the valve structure remaining therein during the life of the valve, continued lapping operation occurs during each operation of the valve by virtue of the movement of the surface 33 against the surface 31 against the pressure of spring 22. Thus, any irregularities in the seat surface which may occur in the use of the valve tend to be removed by the repeated lapping operations.

Thus, the invention comprehends improved fluid seal construction wherein a first sealing element 13 has a first portion defining a first accurately formed surface 31, and a second seal element 30 having a second portion defining a second surface 33 arranged to conform accurately to the first surface 31 and formed of a cold flowable, lapping material. The first surface 31 is lapped-in by relative lateral movement of the two surfaces disposed in facial engagement with each other under a preselected pressure so that the second surface portion 33 extends into the microscopic depressions in the first surface 31 as a result of cold flow of the surface 33 into the lapped surface 31.

Figure 2:
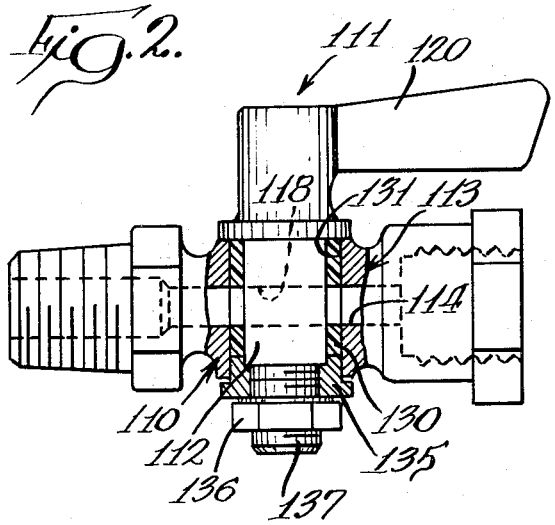
FIG. 2 is a diametric section of a packing gland form of cock plug valve having a fluid seal construction embodying the invention.

The invention further comprehends the provision of such a fluid seal construction wherein the plug sleeve is originally manufactured to a dimension providing a preselected clearance with the confronting surface and means are provided in the structure for altering the configuration of the sleeve plug to the desired conforming configuration. Referring to FIG. 2, such a fluid seal construction generally designated 110 is shown to comprise a cylindrical plug sleeve 130 carried on a serrated, or knurled, plug 112 received in a cylindrical valve seat 131 of a valve body 113. The valve plug is selectively rotatably by means of a handle 120 so as to dispose a through bore 118 of the plug selectively in alignment or disalignment with a through bore 114 of the valve body. A packing gland 135 is disposed adjacent the lower end of the sleeve plug 130 and is forcibly urged thereagainst by means of a packing nut 136 threaded onto a depending threaded end 137 of the plug 112 to provide a preselected axially constrictive force on the cylindrical sleeve 130 causing the sleeve to expand radially into conformity with the confronting seat surface 131. Here, again, the sleeve 130 is formed of a cold flowable, lapping material similar to that of sleeve 30 for effecting the desired microscopically accurate conformation of the confronting seal construction elements illustrated in FIG. 4 relative to the seal construction 10 of the previously described embodiment.

Plug sleeve 130 cooperates with seat 131 substantially in the same manner as does sleeve 30 relative to seat 31. Each of the elements of valve 111 which are similar to corresponding elements of valve 11 are identified by similar reference numerals but 100 higher and function in valve 111 in a similar manner. Thus, seal construction 110 is similar to seal construction 10 except that the plug sleeve surface is selectively disposable in the preselected configuration wherein it conforms to the seat configuration whereas in seal construction 10, the confronting surfaces are originally manufactured to have similar configurations.

Thus, each of seal constructions 10 and 110 provides an improved fluid seal construction while yet being extremely simple and economical of manufacture and permitting facilitated use and maintenance.

The foregoing disclosure of specific embodiments is illustrative of the broad inventive concepts comprehended by the invention.

I claim:

1. A fluid seal construction comprising: a first seal element formed of lappable material and having a first portion defining a first accurately formed surface; and a second seal element having a second portion defining a seal surface arranged to conform accurately to said first surface and formed of a cold flowable, lapping material, said first surface being lapped-in by relative lateral movement of said surfaces disposed in facial engagement with each other under a preselected lapping pressure, said second surface portion extending into microscopic depressions in said first surface as a result of the cold flow of said second surface portion under said pressure, said lapping material further being cold flowed into microscopic depressions in said surface of the first seal element resulting from the lapping-in of the first seal element by the second seal element.

2. The fluid seal construction of claim 1 wherein said second surface portion comprises a synthetic plastic material having abrasive material disposed therein, said abrasive material being preselected to prevent undesirable change in the dimensions of said first seal element as a result of the lapping action therebetween.

3. The fluid seal construction of claim 1 wherein said second surface portion comprises a synthetic plastic material having abrasive fibers disposed therein.

4. The fluid seal construction of claim 1 wherein said second surface portion comprises glass wool fibers disposed therein.

5. The fluid seal construction of claim 1 wherein said second element comprises a movable valve element.

6. The fluid seal construction of claim 1 wherein said second element comprises a movable frustoconical plug valve element.

7. The fluid seal construction of claim 1 including means for maintaining said pressure while permitting relative movement of the lapped surfaces.

8. The fluid seal construction of claim 1 wherein said second surface portion comprises an annular element formed of glass fiber filled Teflon having a radial thickness of approximately one-sixth to one-fourth the outside diameter thereof.

9. The fluid seal construction of claim 1 wherein said second surface portion comprises an annular element formed of 15 percent glass fiber filled Teflon having a radial thickness of approximately one-eighth the outside diameter thereof.

10. The fluid seal construction of claim 1 wherein said second surface portion comprises an annular element formed of glass fiber filled Teflon having an outside diameter which varies axially thereof and approximately one-sixth to one-fourth the average outside diameter thereof.

11. The fluid seal construction of claim 1 wherein said second surface portion has a thickness preselected as a function of radial size thereof to prevent gross cold flow undesirably beyond the edges of the seal elements while yet providing sufficient cold flow to so extend into said microscopic depressions.

12. The fluid seal construction of claim 1 wherein said second seal element comprises a matrix material and fibers distributed therein for reinforcing said matrix material and providing a lapping action with said first seal element surface portion.

13. A fluid seal construction comprising: a first seal element formed of lappable material and having a first portion defining a first accurately formed surface; and a second seal element having a second portion defining a seal surface selectively disposable in a preselected configuration wherein said second surface conforms accurately to said first surface and formed of a cold flowable, lapping material, said first surface being lapped-in by relative lateral movement of said surfaces disposed in facial engagement with each other under a preselected lapping pressure, said second surface portion extending into microscopic depressions in said first surface as a result of the cold flow of said second surface portion under said pressure, said lapping material further being cold flowed into microscopic depressions in said surface of the first seal element resulting from the lapping-in of the first seal element by the second seal element.

14. The fluid seal construction of claim 13 wherein said second surface portion comprises an axially constrictible element adapted to conform accurately to said first surface as a result of a preselected axial constriction thereof.

15. The fluid seal construction of claim 13 wherein threaded means are associated with said first seal element for selectively constricting said second seal element to be disposed in said preselected configuration.

16. The method of forming a fluid seal comprising the steps of: moving a seal element formed of a cold flowable, lapping material against a seal element formed of a lappable material to lap-in said elements; and causing the material of said cold flowable seal element to cold flow into remaining microscopic depressions of said lappable seal element and microscopic depressions caused by the lapping of said lappable seal element.

17. The method of forming a fluid seal of claim 16 wherein said lapping material comprises a preselected abrasive material suitable for said lapping operation with said lappable material.

18. The method of forming a fluid seal of claim 16 wherein said relative motion between said elements is provided subsequent to said lapping and cold flow operations to maintain accurate sealed facial engagement therebetween by a subsequent lapping and cold flow to overcome development of irregularities of the surfaces of said elements in normal use of the fluid seal elements.

19. The method of forming a fluid seal of claim 16 wherein said surfaces are frustoconical and said lapping and cold flow operations are effected by turning one element coaxially with the other while applying axial pressure thereto.

* * * * *